United States Patent
Ohmura

(10) Patent No.: US 9,896,097 B2
(45) Date of Patent: Feb. 20, 2018

(54) DRIVING SUPPORT APPARATUS

(71) Applicant: Mazda Motor Corporation, Aki-gun, Hiroshima (JP)

(72) Inventor: Hiroshi Ohmura, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/360,603

(22) Filed: Nov. 23, 2016

(65) Prior Publication Data

US 2017/0183003 A1    Jun. 29, 2017

(30) Foreign Application Priority Data

Dec. 24, 2015    (JP) .................. 2015-251151

(51) Int. Cl.
*B60T 8/32* (2006.01)
*B60W 30/09* (2012.01)
*B60W 10/04* (2006.01)

(52) U.S. Cl.
CPC ............ *B60W 30/09* (2013.01); *B60W 10/04* (2013.01); *B60W 2420/42* (2013.01); *B60W 2420/52* (2013.01)

(58) Field of Classification Search
CPC .............................. B60W 30/09; B60W 10/04
See application file for complete search history.

(56) References Cited

U.S. PATENT DOCUMENTS

2016/0210525 A1*    7/2016   Yang .................... G06K 9/0063
2017/0101056 A1*    4/2017   Park ....................... B60Q 9/008

FOREIGN PATENT DOCUMENTS

JP          2014139756 A        7/2014

* cited by examiner

*Primary Examiner* — Adam M Alharbi
(74) *Attorney, Agent, or Firm* — Alleman Hall Creasman & Tuttle LLP

(57) ABSTRACT

A driving support apparatus is provided, which includes a processor configured to execute a vulnerable road user detection module for detecting a vulnerable road user that is a pedestrian or a person who rides a two-wheeled vehicle existing ahead of a vehicle, a slowdown zone setting module for setting a slowdown zone around the vulnerable road user detected by the vulnerable road user detection module, and a speed control module for controlling a traveling speed of the vehicle in the slowdown zone set by the slowdown zone setting module below a given speed limit. The slowdown zone setting module changes the size or shape of the slowdown zone according to a moving direction of the vulnerable road user and a moving direction of the vehicle.

14 Claims, 11 Drawing Sheets

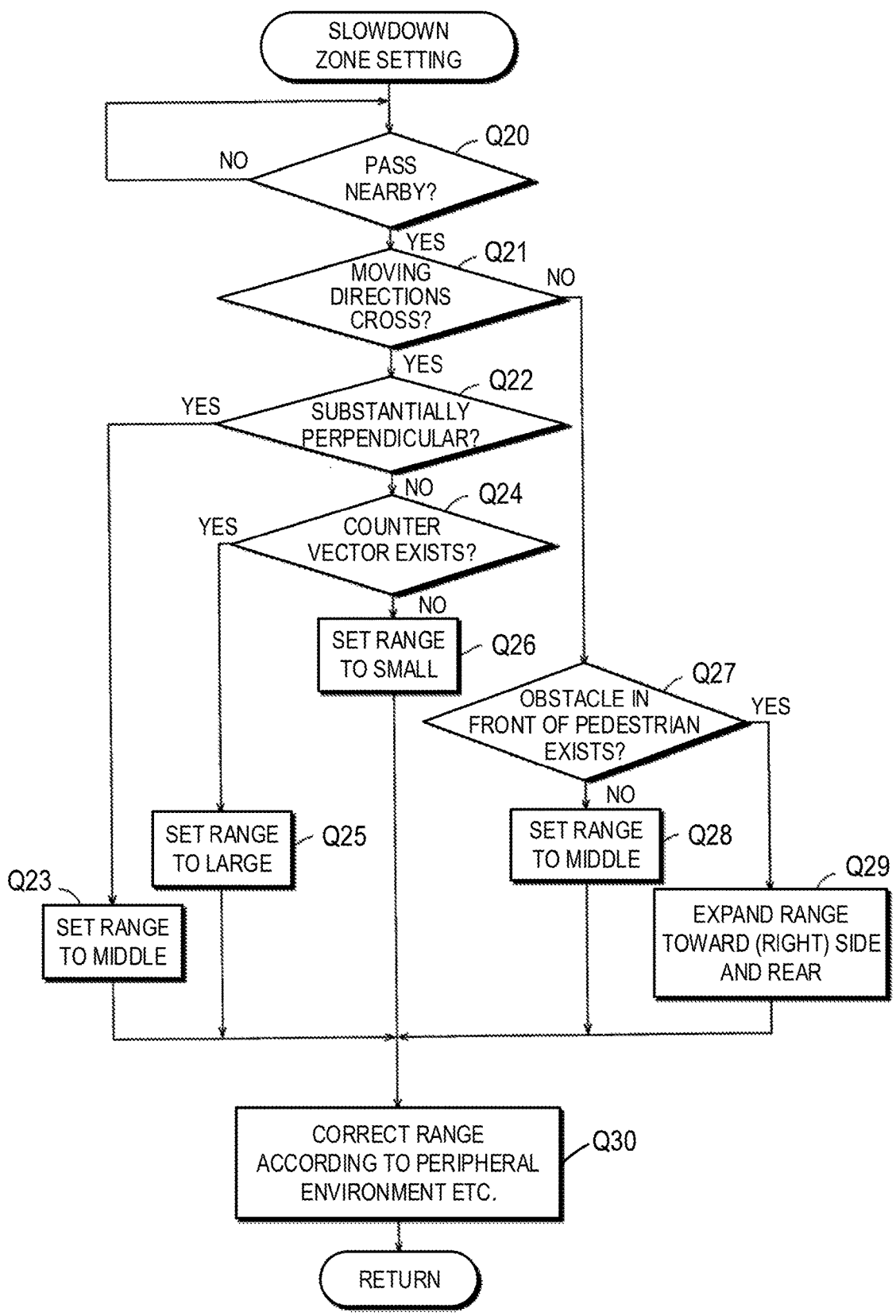

DRIVING SUPPORT APPARATUS

BACKGROUND

The present invention relates to a driving support apparatus.

An increasing number of vehicles provided with an automatic control function of a traveling speed have been on market. For example, vehicles provided with a cruise control device which automatically maintains the vehicles at a given speed have become common, and an automatic driving device having a traveling speed control and a steering angle control has also been put in practical use.

JP2014-139756A discloses a device which slows down a vehicle while avoiding an immediate slowdown, for example, when a vulnerable road user, such as a pedestrian, a bicyclist, or a motorcyclist, exists ahead of the vehicle, and the vehicle may pass near the vulnerable road user although there is no possibility of a collision with the vulnerable road user.

Here, due to the cruise control and/or the automatic driving, the vehicle may pass considerably near the vulnerable road user at a remarkably high speed. The vulnerable road user may then be surprised by the vehicle passing by, and the vulnerable road user may fall on the ground in some extreme cases. Those situations are not desirable. Thus, JP2014-139756A also discloses that the vehicle passes near the vulnerable road user at a reduced speed. However, a simple uniform speed reduction may often be unnecessary when the vehicle passes near the vulnerable road user and, thus, a certain countermeasure is desired.

SUMMARY

The present invention is made in view of the above issues, and provides a driving support apparatus, capable of avoiding an excessive slowdown of a vehicle, while preventing a vulnerable road user from being surprised, when the vehicle passes near the vulnerable road user. Note that the term "vulnerable road user" as used herein refers to a pedestrian, or a person who rides a two-wheeled vehicle, such as a bicycle, a motorcycle, a moped, or a smaller vehicle which may suffer more damages when it collides with a vehicle that carries the driving support apparatus according to the present invention.

According to one aspect of the present invention, a driving support apparatus is provided. The driving support apparatus includes a controller configured to execute a vulnerable road user detection module for detecting a vulnerable road user that is at least one of a pedestrian and a person who rides a two-wheeled vehicle existing ahead of a vehicle, a slowdown zone setting module for setting a slowdown zone around the vulnerable road user detected by the vulnerable road user detection module, and a speed control module for controlling a traveling speed of the vehicle in the slowdown zone set by the slowdown zone setting module below a given speed limit. The slowdown zone setting module changes at least one of the size and shape of the slowdown zone according to a moving direction of the vulnerable road user and a moving direction of the vehicle.

According to the above configuration, the vulnerable road user is prevented from being surprised when the vehicle passes near the vulnerable road user since the traveling speed of the vehicle is controlled when passing the set slowdown zone. Meanwhile when the vehicle does not pass the slowdown zone, since the vehicle is not controlled to slow down, an unnecessary slowdown is prevented.

The slowdown zone setting module may expand the slowdown zone in the moving direction of the vulnerable road user when the moving direction of the vulnerable road user crosses the moving direction of the vehicle. Here, when the moving directions cross with each other, the possibility that the vulnerable road user is startled by the vehicle passing is extremely high. In such case, expanding the slowdown zone in the moving direction of the vulnerable road user (e.g., a pedestrian) is preferable in order to reliably prevent a situation making the vulnerable road user surprised.

The slowdown zone setting module may change at least one of the size and shape of the slowdown zone according to an environment around the vulnerable road user. By this, the slowdown zone is suitably set in consideration of the environment around the vulnerable road user, which is preferable in preventing the unnecessary slowdown and preventing the vulnerable road user from being surprised.

The environment around the vulnerable road user may include one of a sidewalk and a guiderail. By this, the slowdown zone is suitably set according to the existence of the side walk and/or the guiderail, which is preferable in preventing the unnecessary slowdown and preventing the vulnerable road user from being surprised.

The slowdown zone setting module may change at least one of the size and shape of the slowdown zone according to a type of the vulnerable road user related to age. By this, the slowdown zone is set in consideration of age of, for example, a child moving erratically or an elderly person moving slowly, which is preferable in preventing the unnecessary slowdown and preventing the vulnerable road user from being surprised.

The slowdown zone setting module may expand the slowdown zone toward a traveling lane of the vehicle when an obstacle is detected in the moving direction of the vulnerable road user. Here, the possibility that the vulnerable road user moves toward the traveling lane of the vehicle so as to avoid the obstacle in front is high. In such case, predicting such a movement of the vulnerable road user to set the slowdown zone is preferable in preventing the unnecessary slowdown and preventing the vulnerable road user from being surprised.

The slowdown zone setting module may set the slowdown zone around a group of vulnerable road users when the vulnerable road users are located close to each other. By this, the slowdown zone is suitably set considering the group of vulnerable road users to be a single large-sized vulnerable road user, which is preferable in preventing the unnecessary slowdown and preventing the vulnerable road users from being surprised.

The slowdown zone setting module may change the size of the slowdown zone according to whether a vector component of the moving direction of the vulnerable road user counters the moving direction of the vehicle. Here, even at the same vehicle speed, the degree of the vulnerable road user being surprised varies depending on whether the vulnerable road user moves obliquely toward the vehicle or obliquely away from the vehicle. In such case, setting the slowdown zone in consideration of the degree of surprise is preferable in preventing the unnecessary slowdown and preventing the vulnerable road user from being surprised.

The slowdown zone setting module may set the slowdown zone so that one of left and right parts of the slowdown zone around the vulnerable road user that is located toward a traveling lane of the vehicle in a plan view is larger than the other of the left and right parts located toward the opposite direction, when the vulnerable road user moves substantially in parallel to the moving direction of the vehicle. This configuration is preferable in order to minimize a setting range of the slowdown zone to be as small as possible.

The slowdown zone setting module may set a plurality of slowdown zones so that the speed limits become gradually faster from the slowdown zone located closer to the vulnerable road user to the slowdown zone located away from the vulnerable road user. This configuration is further preferable than a case of setting only one level of the slowdown zone, in order for preventing the unnecessarily slowing down and preventing the vulnerable road user from being surprised.

BRIEF DESCRIPTION OF THE DRAWINGS

FIG. 11 is a flowchart illustrating a detail of the setting of the slowdown zone illustrated in FIG. 10.

DETAIL DESCRIPTION

Figure 1:
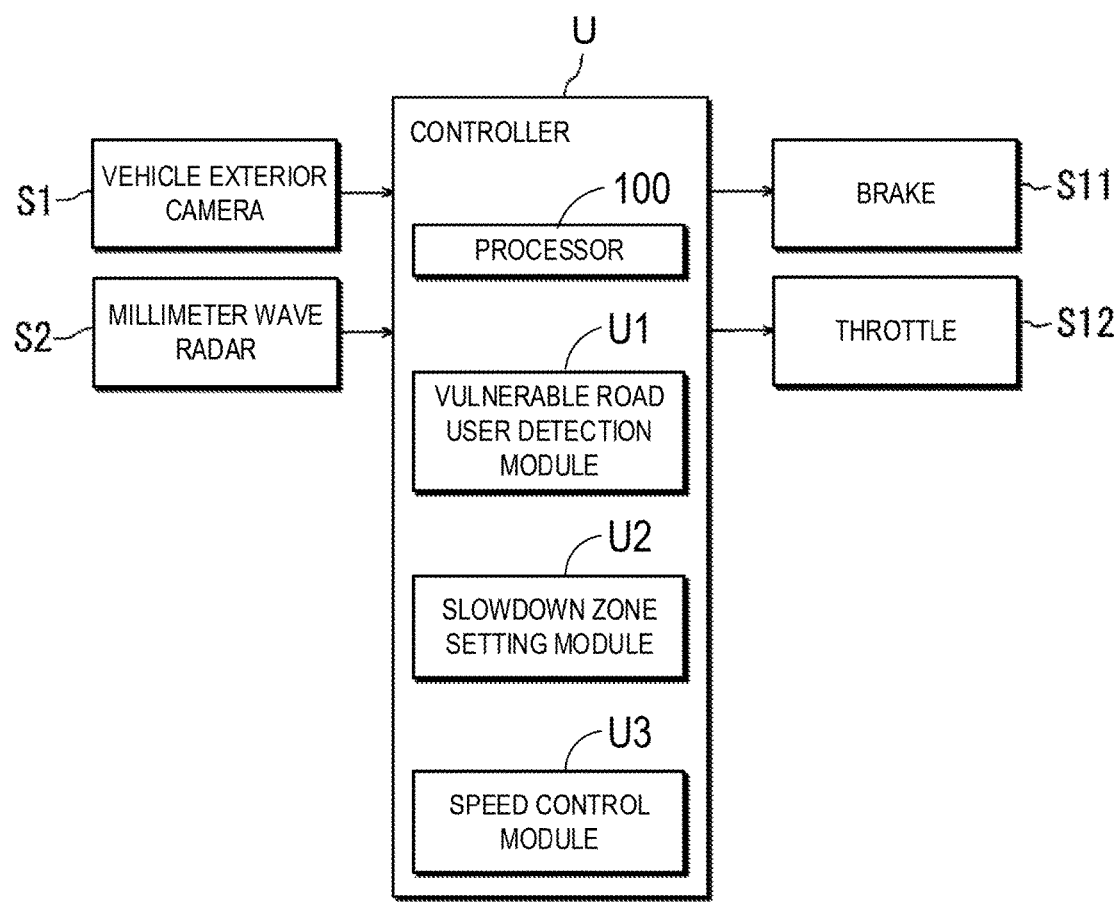
FIG. 1 is a block diagram illustrating one example of a control system (driving support apparatus) according to one embodiment of the present invention.

FIG. 1 is a block diagram illustrating a control system which is one example of a driving support apparatus according to one embodiment of the present invention. The control system is mounted on a vehicle V (hereinafter, referred to as "the vehicle" in order to distinguish it from other vehicles; see, e.g., FIG. 2). In FIG. 1, a reference character "U" indicates a controller (control unit) comprised of a processor 100 configured to execute various software modules U1 to U3. Signals from camera(s) S1 which images a perimeter situation ahead of the vehicle V, and a radar S2 (in this embodiment, a millimeter wave radar) which detects a distance to an obstacle ahead of the vehicle, are inputted into the controller U. The controller U controls a brake device S11 and a throttle actuator S12 for a slowdown control which is described later.

Next, example settings of slowdown zones are described with reference to FIGS. 2 to 4. Note that the following description is made entirely on a premise that the vehicle V passes near a pedestrian but it does not collide with the pedestrian.

Figure 2:
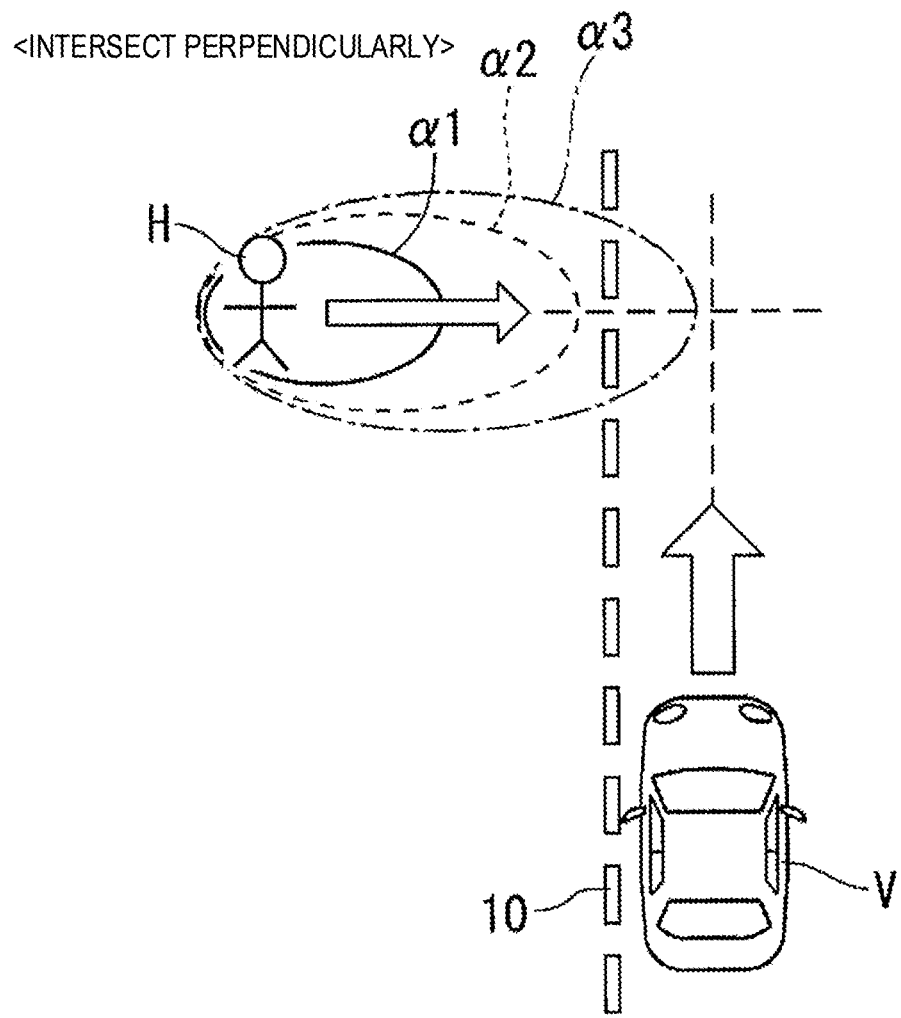
FIG. 2 is a view illustrating an example setting of slowdown zones when a moving direction of a pedestrian crosses substantially perpendicularly to a moving direction of a vehicle.
Figure 3:
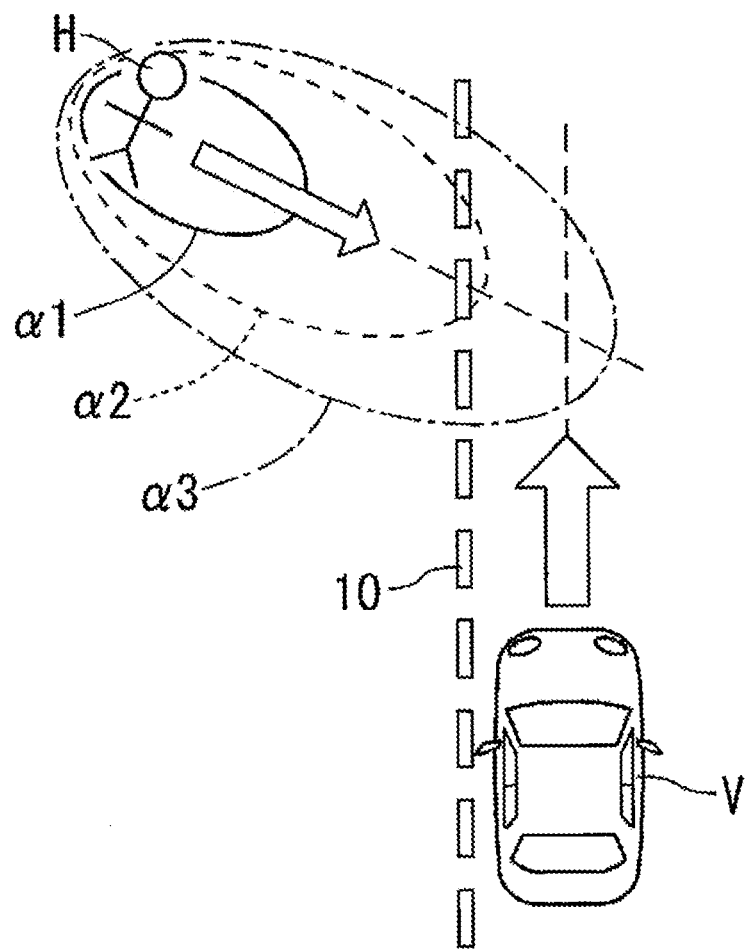
FIG. 3 is a view illustrating another example setting of the slowdown zones when the pedestrian's moving direction has a vector component which counters the vehicle moving direction.
Figure 4:
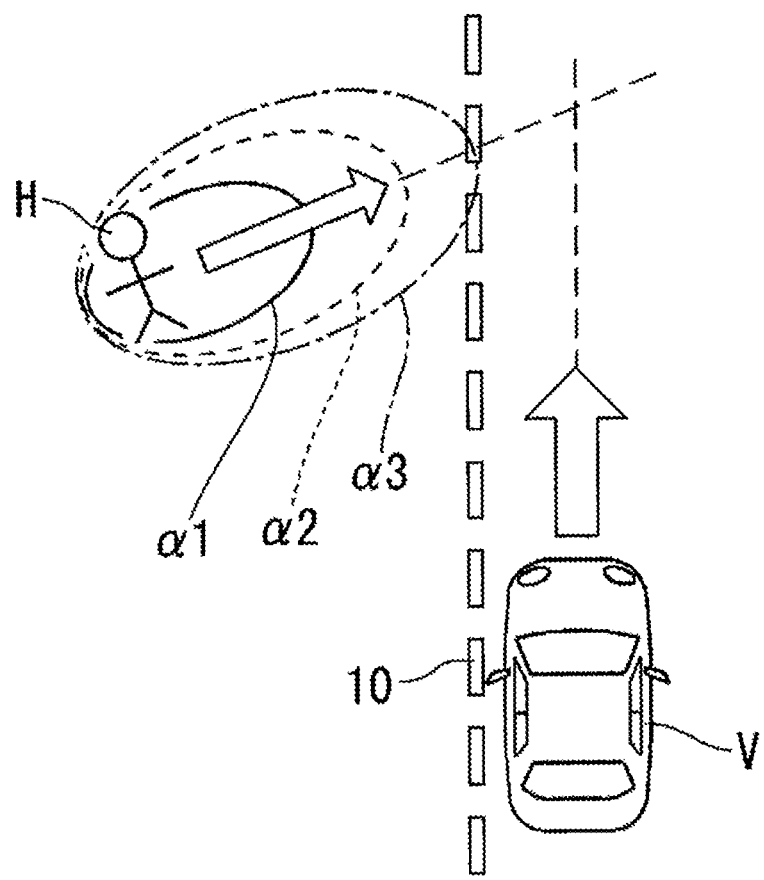
FIG. 4 is a view illustrating another example setting of the slowdown zones when the pedestrian's moving direction has a vector component which goes in the same direction as the vehicle moving direction.

First, FIGS. 2 to 4 illustrate the example settings when a moving direction of a pedestrian H as the vulnerable road user crosses a moving direction of the vehicle V. In these drawings, arrows indicate the respective moving directions, and a reference numeral "10" indicates a boundary line (a so-called "white line") between a lane where the vehicle V is traveling and a road shoulder. The pedestrian H exists on a sidewalk side from the boundary line 10 and is walking toward the traveling lane of the vehicle V.

In the case of FIG. 2, the moving direction of the pedestrian H intersects substantially perpendicular to the moving direction of the vehicle V (e.g., a range of 90°±20°). Here, the slowdown zones are set as middle ranges (basic zones). In detail, a first slowdown zone α1 is set closest to the pedestrian H, a second slowdown zone α2 is set outside the first slowdown zone α1, and a third slowdown zone α3 is set outside the second slowdown zone α2. The slowdown zones α1-α3 extend so that they are elongated in the moving direction of the pedestrian H (in this embodiment, having a substantially elliptical shape), and they do not exist in the opposite direction from the moving direction of the pedestrian H.

The first slowdown zone α1 is a zone for carrying out a slowdown control of the vehicle V so that the vehicle V travels at a first given speed or below (e.g., 10 km/h or below, including a stopped state or 0 km/h) within the first slowdown zone α1 if it is predicted that the vehicle V passes through this zone. The second slowdown zone α2 is a zone for carrying out a slowdown control of the vehicle V so that the vehicle V travels at a speed not exceeding a second given speed (e.g., 20 km/h) which is faster than the first speed if it is predicted that the vehicle V passes through this zone. The third slowdown zone α3 is a zone for carrying out a slowdown control of the vehicle V so that the vehicle V travels at a speed not exceeding a third given speed (e.g., 40 km/h) which is faster than the second speed if it is predicted that the vehicle V passes through this zone.

In the case of FIG. 3, which is a case other than the substantially perpendicular state described in FIG. 2, the moving direction of the pedestrian H contains a vector component which counters the moving direction of the vehicle V. In this case, although the first to third slowdown zones α1-α3 are set, the slowdown zones α1-α3 are expanded in lateral directions and the moving direction of the pedestrian H, compared with the zones set in the case of FIG. 2 (basic zones). That is, the area of each slowdown zone is larger. The slowdown zones are set in consideration of the degree of the pedestrian H being surprised (the degree of surprise) becoming higher when the vehicle V approaches as it counters the pedestrian H.

In the case of FIG. 4, which is another case other than the substantially perpendicular state described in FIG. 2, the moving direction of the pedestrian H contains a vector component of which the direction is the same as the moving direction of the vehicle V. In this case, although the first to third slowdown zones α1-α3 are set, the slowdown zones α1-α3 are contracted in the moving direction of the pedestrian H, compared with the zones set in the case of FIG. 2 (basic zones). That is, the area of each slowdown zone is smaller. The slowdown zones are set in consideration of the degree of surprise becoming lower, as compared with the cases of FIGS. 2 and 3, when the vehicle V approaches from obliquely rearward.

As already been clear from the example settings of the slowdown zones illustrated in FIGS. 2 to 4, if a relative speed when the vehicle V passes near the pedestrian H is high (the case of FIG. 3), the slowdown zones are expanded, compared with the case when the relative speed is low (the case of FIG. 4) so that the pedestrian H will not be surprised when the vehicle V passes therethrough. That is, the vehicle V being unnecessarily slowed down due to the slowdown zones remaining expanded is prevented.

Figure 5:
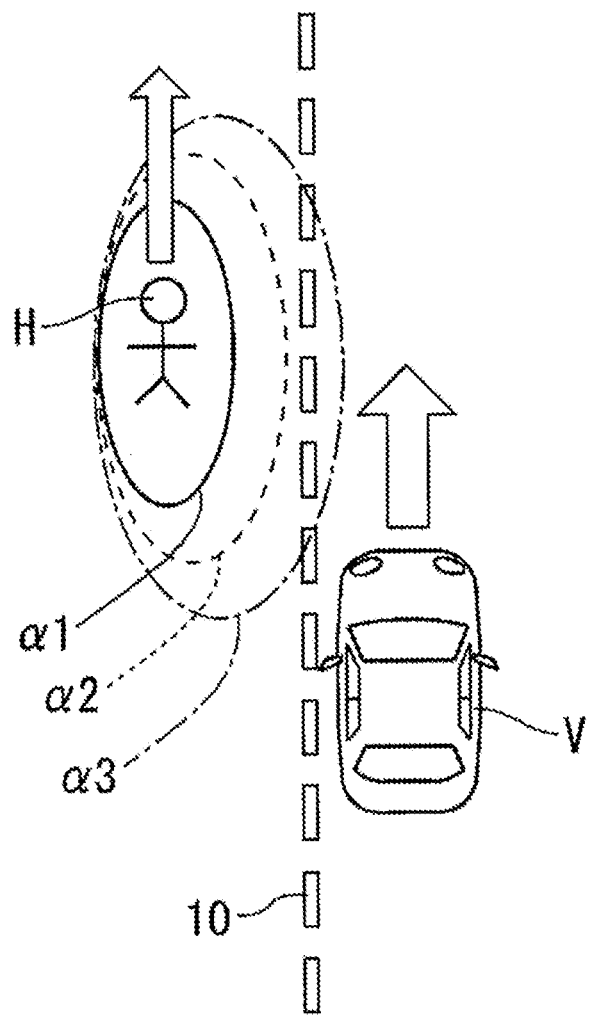
FIG. 5 is a view illustrating a first example setting of the slowdown zones when the pedestrian's moving direction is substantially the same as the vehicle moving direction and, thus, the pedestrian moves in parallel to the vehicle.

FIGS. 5 to 9 illustrate example settings of the slowdown zone when the moving direction of the pedestrian H is substantially the same as the moving direction of the vehicle V and, thus, the pedestrian H moves in parallel to the vehicle V (the pedestrian H moves in parallel to the moving direction of the vehicle V, or moves at an angle, for example, within a range of ±20° with respect to the parallel direction). In FIG. 5, the pedestrian H exists at a position distant from the traveling lane of the vehicle V by a slightly greater distance. The slowdown zones are set forward and rearward of the pedestrian H, and also set on the traveling lane side of the vehicle V. Here, the slowdown zones are set shorter on the traveling lane side, as compared with the case illustrated in FIGS. 2 to 4.

Figure 6:
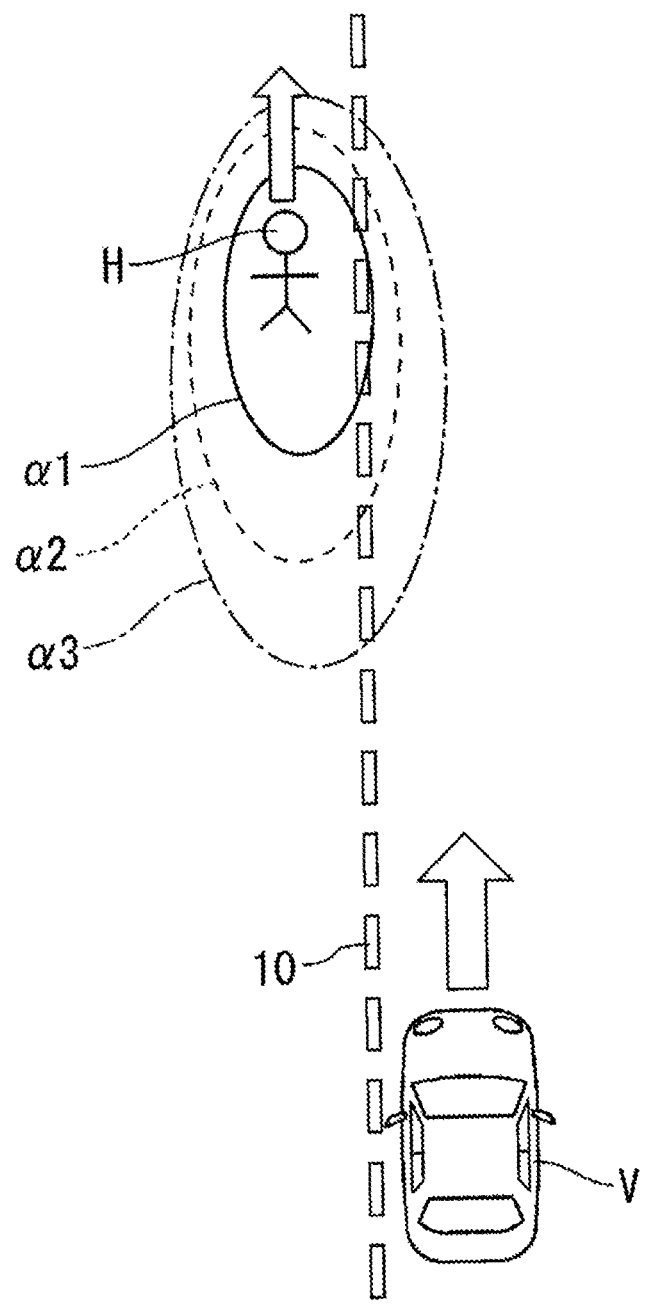
FIG. 6 is a view illustrating a second example setting of the slowdown zones when the pedestrian's moving direction is substantially the same as the vehicle moving direction and, thus, the pedestrian moves in parallel to the vehicle.

FIG. 6 illustrates another example of the slowdown zones when the moving direction of the pedestrian H is substantially the same as the moving direction of the vehicle V and, thus, the pedestrian H moves in parallel to the vehicle V. In this example, the pedestrian H exists at a position closer to the traveling lane of the vehicle V, as compared with the case of FIG. 5. In the case of FIG. 6, the slowdown zones are expanded to the traveling lane side of the vehicle V, and rearward of the pedestrian H, while being contracted forward of the pedestrian H, as compared with the case of FIG. 5.

Figure 7:
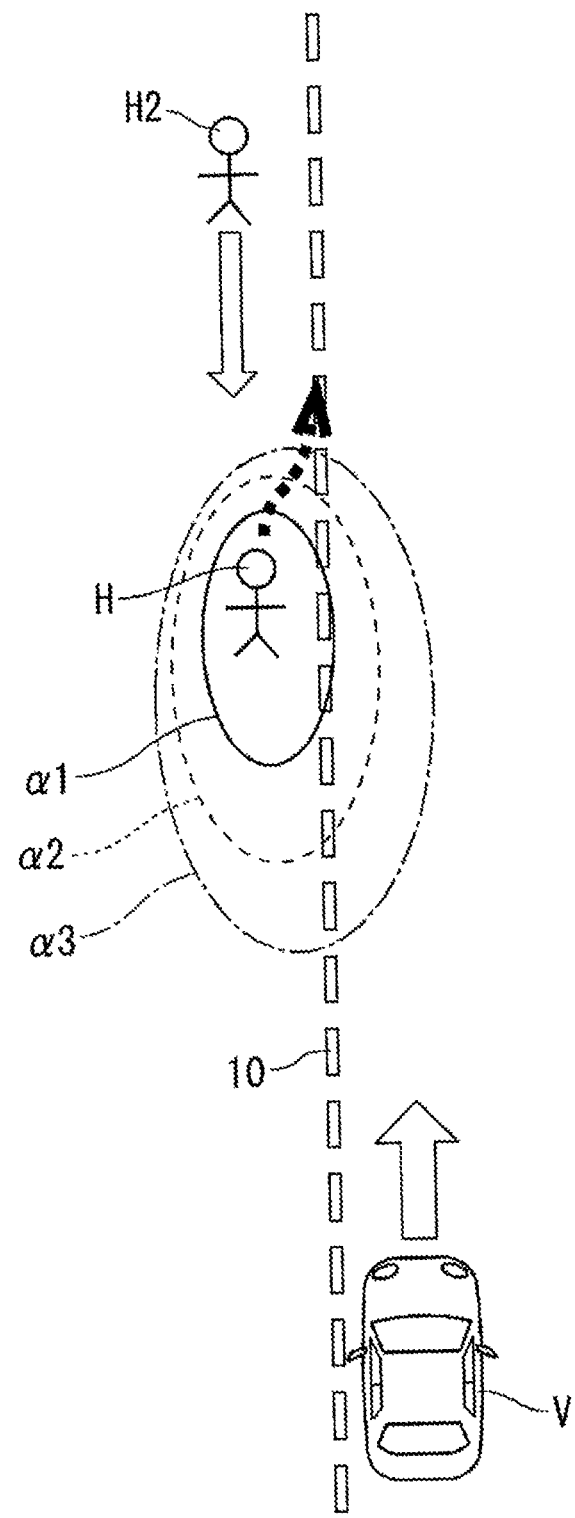
FIG. 7 is a view illustrating a third example setting of the slowdown zones when the pedestrian's moving direction is substantially the same as the vehicle moving direction and, thus, the pedestrian moves in parallel to the vehicle.

FIG. 7 is a case where it is predicted that the pedestrian H who is walking along the sidewalk moves toward the traveling lane of the vehicle V in order to avoid another pedestrian H2 who approaches from the front. In FIG. 7, the slowdown zones are expanded to the traveling lane side of the vehicle V, and rearward of the pedestrian H, while being contracted forward of the pedestrian H, as compared with the case of FIG. 5.

Figure 8:
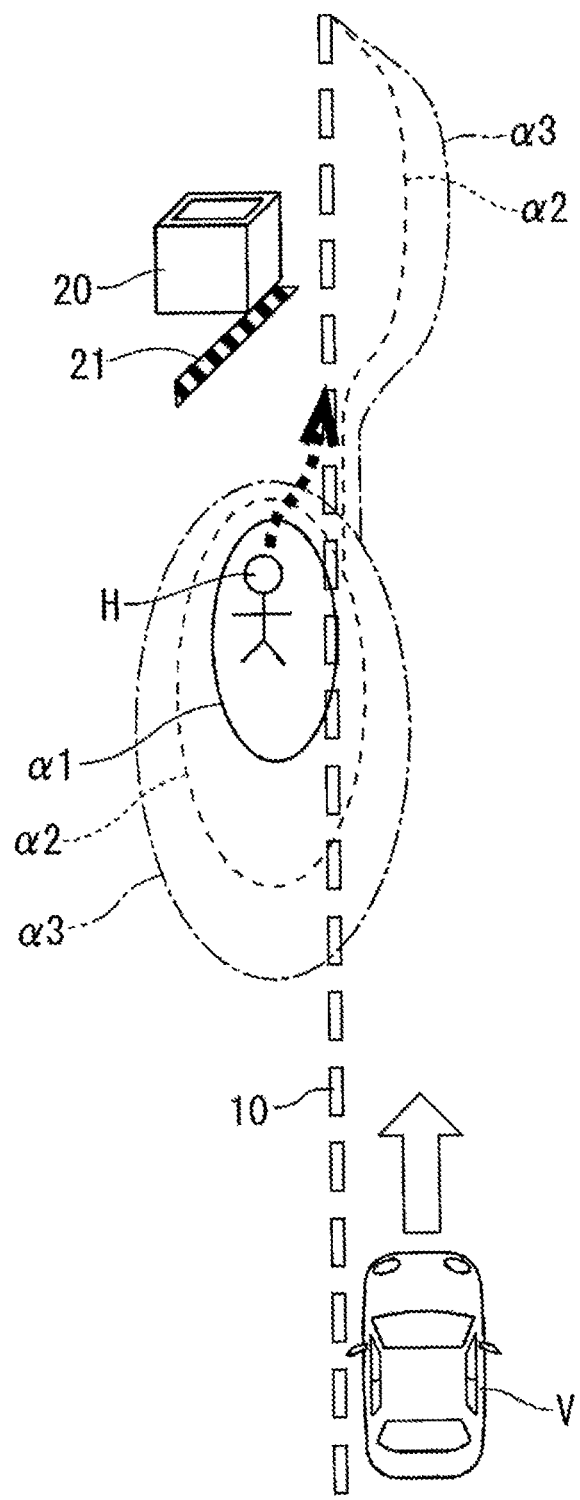
FIG. 8 is a view illustrating a fourth example setting of the slowdown zones when the pedestrian's moving direction is substantially the same as the vehicle moving direction and, thus, the pedestrian moves in parallel to the vehicle.

FIG. 8 is a case where stationary obstacles 20 and 21 exist, instead of the pedestrian H2 forward of the pedestrian H in the case of FIG. 7. In the case of FIG. 8, it is predicted that the pedestrian H walks outside the sidewalk, into the traveling lane of the vehicle V. Here, the slowdown zones are set, in addition to the slowdown zone of FIG. 7, so that they further extend deeply into the traveling lane of the vehicle V to cover forward and rearward of the obstacles 20 and 21. Note that, although only the slowdown zones α2 and α3 are expanded so as to cover forward and rearward of the obstacles 20 and 21 among the slowdown zones α1-α3 in the example of FIG. 8, the slowdown zone α1 may also similarly be expanded so as to cover forward and rearward of the obstacles 20 and 21.

Figure 9:
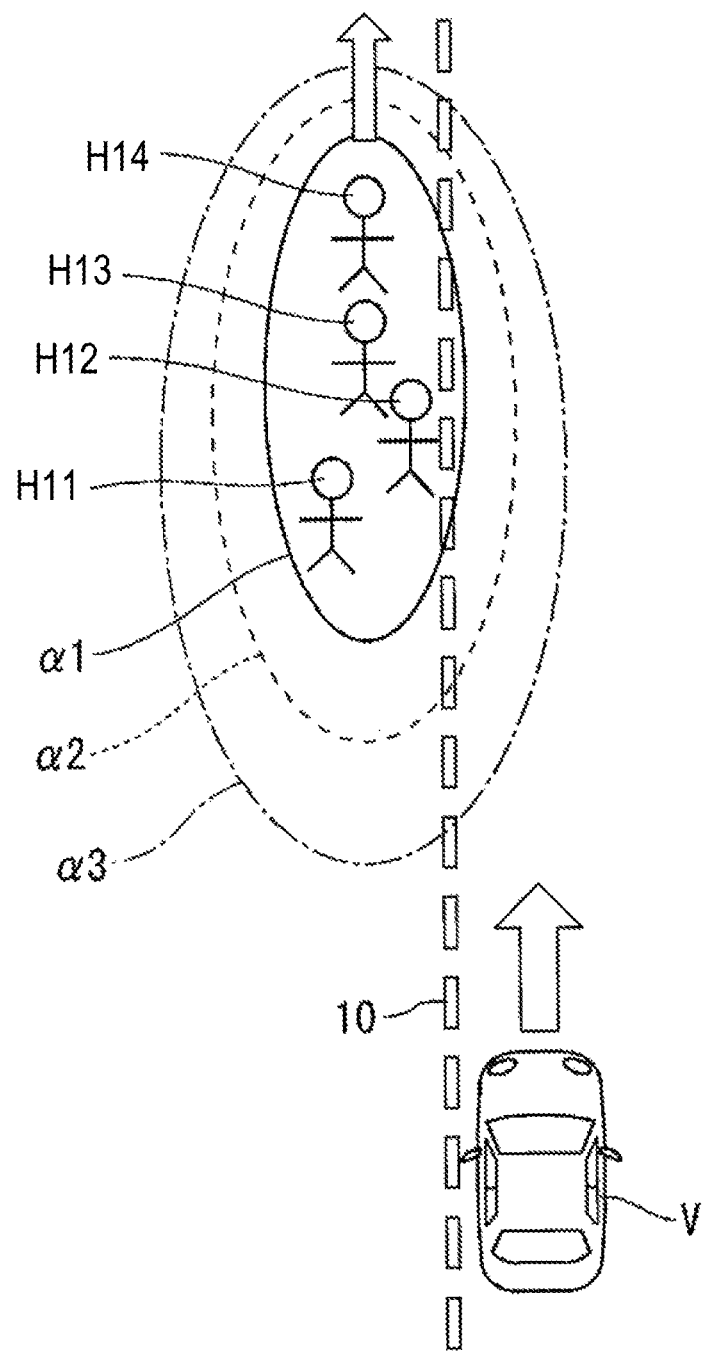
FIG. 9 is a view illustrating another example setting of the slowdown zones when a moving direction of a group of pedestrians is substantially the same as the vehicle moving direction and, thus the pedestrian group moves in parallel to the vehicle.

FIG. 9 illustrates one example where a group of pedestrians H11-H14 exist. In this case, the group of pedestrians H11-H14 is considered to be a single large-sized pedestrian, and the slowdown zones are set so as to entirely surround the large-sized pedestrian. Note that, in FIG. 9, the slowdown zones α1-α3 may also be formed so as to hardly exist on the opposite side from the traveling lane of the vehicle V, similar to the case of FIG. 5.

Figure 10:
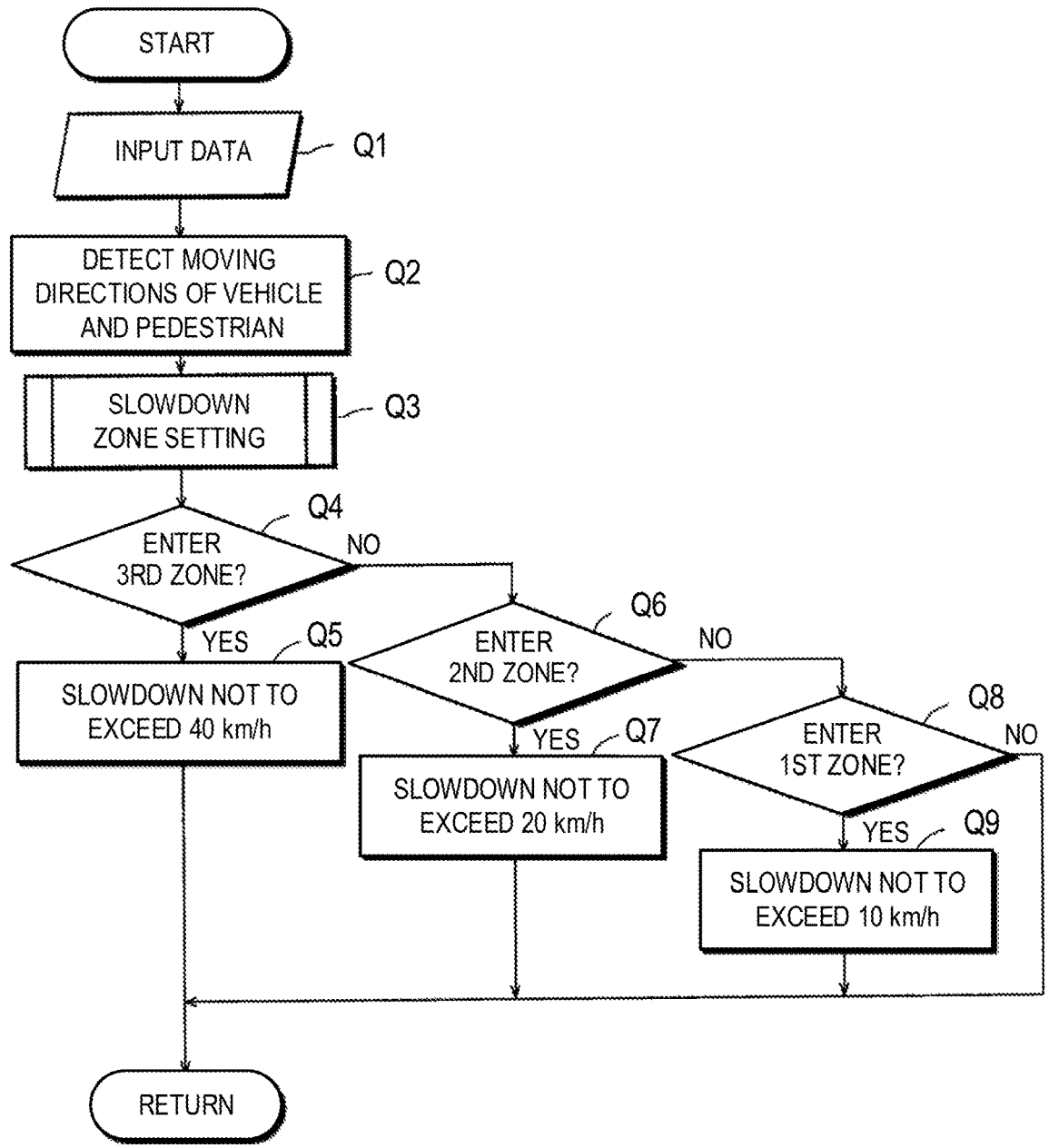
FIG. 10 is a flowchart illustrating one example of a control by the control system illustrated in FIG. 1.

Next, one example of a control by the controller U related to the slowdown zones is described with reference to a flowchart of FIG. 10 and a subroutine of FIG. 11. Note that "Q" indicates each step of the control process in the following description. First, at Q1, the signals from the camera (s) S1 and the radar S2 are inputted to the controller U, and the controller U executes a vulnerable road user detection module U1 to detect the existence and the position of the pedestrian as the vulnerable road user (including a distance from the vehicle V). At Q2, the controller U detects the moving direction of the vehicle V and the pedestrian's moving direction. At Q3, the controller U sets the slowdown zones, as described later in detail.

At Q4, the controller U determines whether the vehicle V enters into the third slowdown zone α3 among the slowdown zones. If the determination at Q4 is YES, the controller U executes a speed control module U3 to perform a throttle control (a slowdown by reducing the engine output) at Q5 so that the vehicle speed when the vehicle reaches the slowdown zone α3 does not exceed the third speed (e.g., 40 km/h). In the throttle control, a brake control (a slowdown by applying brakes) may be performed when the slowdown is insufficient.

On the other hand, if the determination at Q4 is NO, the controller U then determines at Q6 whether the vehicle V enters into the second slowdown zone α2 among the slowdown zones. If the determination is YES at Q6, the controller U executes the speed control module U3 to perform the throttle control (the slowdown by reducing the engine output) at Q7 so that the vehicle speed when reaching the slowdown zone α2 does not exceed the second speed (e.g., 20 km/h). In the throttle control, the brake control (the slowdown by applying brakes) may be performed when the slowdown is insufficient.

On the other hand, if the determination is NO at Q6, the controller U then determines at Q8 whether the vehicle V enters into the first slowdown zone α1 among the slowdown zones. If the determination is YES at Q8, the controller U executes the speed control module U3 to perform the throttle control (the slowdown by reducing the engine output) at Q9 so that the speed when reaching the slowdown zone α1 does not exceed the first speed (e.g., 10 km/h). In the throttle control, the brake control (the slowdown by applying brakes) may be performed when the slowdown is insufficient. If the determination is NO at Q8, the current vehicle speed is maintained since the slowdown is considered to be unnecessary.

Details of Q3 described above are described with reference to FIG. 11. First, at Q20, the controller U determines whether the vehicle V passes near the pedestrian (whether the vehicle V passing near the pedestrian is predicted). If the determination is NO at Q20, the processing returns (without setting the slowdown zones). Note that the determination of whether the slowdown zones are set (the determination of whether the vehicle V passes near the pedestrian) is performed, for example, between Q1 and Q2 in FIG. 10 (if not passing near the pedestrian, processing at Q2 and subsequent processings are unnecessary).

If the determination is YES at Q20, the controller U determines at Q21 whether the pedestrian's moving direction crosses the moving direction of the vehicle V. If the determination is YES at Q21, the controller U determines at Q22 whether the pedestrian's moving direction intersects substantially perpendicular to the moving direction of the vehicle V (a determination of whether it is in the state of FIG. 2). If the determination YES at Q22, the controller U executes a slowdown zone setting module U2 to set the slowdown zones at Q23, for example, as illustrated in FIG. 2.

On the other hand, if the determination is NO at Q22, the controller U determines at Q24 whether the pedestrian's moving direction has the vector component which counters the moving direction of the vehicle V (a determination of whether it is in the state of FIG. 3). If the determination is YES at Q24, the controller U executes the slowdown zone setting module U2 to set the slowdown zones at Q25, for example, as illustrated in FIG. 3.

If the determination is NO at Q24, it is a case where the pedestrian's moving direction has the vector component of the same direction as the moving direction of the vehicle V as illustrated in FIG. 5. At this time, the controller U executes the slowdown zone setting module U2 to set the slowdown zones at Q26, for example, as illustrated in FIG. 4.

If the determination is NO at Q21, it is a case where the pedestrian moves substantially in parallel to the vehicle V (the pedestrian moves in the same direction as or the opposite direction from the moving direction of the vehicle V). At this time, the controller U determines at Q27 whether a front obstacle (a pedestrian in front, or a stationary obstacle, etc.) exists. If the determination is NO at Q27, the controller U executes the slowdown zone setting module U2 to set the slowdown zones at Q28, for example, as illustrated in FIG. 5, 6, or 9, according to the situation. If the determination is YES at Q27, the controller U executes the slowdown zone setting module U2 to set the slowdown zones, at Q29, for example, as illustrated in FIG. 7 or 8.

After Q23, Q25, Q26, Q28, or Q29, the controller U executes the slowdown zone setting module U2 to correct at Q30 the slowdown zones which are set as described above. The correction at Q30 is a correction according to, for example, a situation around the pedestrian, and is performed according to weather (visibility), a pedestrian type (e.g., an adult, a child, or an elderly person by age), a structure of the road, etc. For example, for the case of weather, although no correction is needed during daytime with good visibility, the slowdown zones are corrected so as to be expanded in the corresponding directions described above when visibility is bad, such as at night or during rainy weather. Moreover, if the pedestrian is an adult, although no correction is needed, it is corrected so as to be expanded in the corresponding directions when the pedestrian is a child or an elderly person. As for the road structure, if there is no sidewalk, or if there is a sidewalk but it is separated from a vehicle lane by a white line (no step between the sidewalk and the lane), no correction is needed. On the other hand, if there is a step between the sidewalk and the lane, the slowdown zones are corrected to contract, and if there is a guiderail or guardrail, the slowdown zones are corrected to contract or no slowdown zone is set.

Although the embodiment is described above, the present invention is not limited to the embodiment and may be suitably changed or modified within the scope and spirit of the invention cited in the appended claims. Note that the vulnerable road user may be an operator of a two-wheeled vehicle (especially, a bicycle), instead of the pedestrian. Note that although the shape of the slowdown zones is a substantially elliptical shape in the embodiment, the shape may be any other suitable shape, such as a narrow rectangle extending in a circumferential direction of the vulnerable road user, or a triangle (wider as it separates from the pedestrian). The slowdown zones may be changed in the shape instead of the range, or may be changed in both the shape and the range. Moreover, the correction of the slowdown zones may also be performed by changing the shape of the slowdown zones, instead of expanding or contracting the slowdown zones (or the correction may be performed by both the expansion and contraction, and the shape change). The vehicle speeds set as the speed limits in the slowdown zones may also be set as relative speeds of the vehicle V with respect to the vulnerable road user, such as the pedestrian. For example, if the relative speed is set to 0 in one of the slowdown zones, since the relative speed cannot be 0 when the pedestrian walks toward the vehicle V, the vehicle V may be just stopped. When the pedestrian walks in the same direction as the vehicle V, the vehicle speed may be slowed down to the walking speed of the pedestrian. Although the slowdown zones have three levels of $\alpha 1$-$\alpha 3$, they may have only one level, or two levels, or four or more levels. Steps and a group of steps illustrated in the flowchart and the subroutine correspond to functions of the controller U and, alternatively, these functions may also be implemented as the modules U1 to U3 that constitute the controller U. Of course, the purpose of the present invention is not limited to those expressly described, but may also implicitly include those described as substantially desirable or advantageous.

The present invention is desirable for preventing the vehicle from unnecessarily slowing down, while preventing the vulnerable road user, such as a pedestrian, from being surprised, when the vehicle passes near the vulnerable road user.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

LIST OF REFERENCE CHARACTERS

U Controller
S1 Camera (For Vulnerable Road User Detection and Moving Direction Detection)
S2 Radar (For Vulnerable Road User Detection and Moving Direction Detection)
S11 Brake (For Slowdown Control)
S12 Throttle Actuator (For Slowdown Control)
V Vehicle
H Pedestrian
H2 Front Pedestrian (Front Obstacle)
H11-H14 Pedestrians (Group of Pedestrians)
$\alpha 1$ Slowdown Zone (Low Speed Area)
$\alpha 2$ Slowdown Zone (Middle Speed Area)
$\alpha 3$ Slowdown Zone (High Speed Area)
10 Boundary Line (Between Vehicle Traveling Lane and Sidewalk)
20, 21 Obstacle (Stationary Object)

What is claimed is:
1. A driving support apparatus, comprising:
a processor configured to execute:
a vulnerable road user detection module for detecting a vulnerable road user that is at least one of a pedestrian and a person who rides a two-wheeled vehicle existing ahead of a vehicle;

a slowdown zone setting module for setting a slowdown zone around the vulnerable road user detected by the vulnerable road user detection module; and a speed control module for controlling a traveling speed of the vehicle in the slowdown zone set by the slowdown zone setting module below a given speed limit, wherein the slowdown zone setting module expands the slowdown zone in a moving direction of the vulnerable road user when the moving direction of the vulnerable road user crosses the moving direction of the vehicle, such that a size of the slowdown zone in the moving direction of the vulnerable road user becomes greater as a relative angle between the moving directions of the vulnerable road user and the vehicle approaches 180 degrees.

2. The driving support apparatus of claim 1, wherein the slowdown zone setting module changes at least one of the size and shape of the slowdown zone according to an environment around the vulnerable road user.

3. The driving support apparatus of claim 2, wherein the environment around the vulnerable road user includes one of a sidewalk and a guiderail.

4. The driving support apparatus of claim 2, wherein the slowdown zone setting module expands the slowdown zone toward a traveling lane of the vehicle when an obstacle is detected in the moving direction of the vulnerable road user.

5. The driving support apparatus of claim 2, wherein the slowdown zone setting module sets the slowdown zone around a group of vulnerable road users when the vulnerable road users are located close to each other.

6. The driving support apparatus of claim 2, wherein the slowdown zone setting module changes the size of the slowdown zone according to whether a vector component of the moving direction of the vulnerable road user counters the moving direction of the vehicle.

7. The driving support apparatus of claim 2, wherein the slowdown zone setting module sets the slowdown zone so that one of left and right parts of the slowdown zone around the vulnerable road user that is located toward a traveling lane of the vehicle in a plan view is larger than the other of the left and right parts located toward the opposite direction, when the vulnerable road user moves substantially in parallel to the moving direction of the vehicle.

8. The driving support apparatus of claim 2, wherein the slowdown zone setting module sets a plurality of slowdown zones so that the speed limits become gradually faster from the slowdown zone located closer to the vulnerable road user to the slowdown zone located away from the vulnerable road user.

9. The driving support apparatus of claim 1, wherein the slowdown zone setting module changes at least one of the size and shape of the slowdown zone according to a type of the vulnerable road user related to age.

10. The driving support apparatus of claim 1, wherein the slowdown zone setting module expands the slowdown zone toward a traveling lane of the vehicle when an obstacle is detected in the moving direction of the vulnerable road user.

11. The driving support apparatus of claim 1, wherein the slowdown zone setting module sets the slowdown zone around a group of vulnerable road users when the vulnerable road users are located close to each other.

12. The driving support apparatus of claim 1, wherein the slowdown zone setting module changes the size of the slowdown zone according to whether a vector component of the moving direction of the vulnerable road user counters the moving direction of the vehicle.

13. The driving support apparatus of claim 1, wherein the slowdown zone setting module sets the slowdown zone so that one of left and right parts of the slowdown zone around the vulnerable road user that is located toward a traveling lane of the vehicle in a plan view is larger than the other of the left and right parts located toward the opposite direction, when the vulnerable road user moves substantially in parallel to the moving direction of the vehicle.

14. The driving support apparatus of claim 1, wherein the slowdown zone setting module sets a plurality of slowdown zones so that the speed limits become gradually faster from the slowdown zone located closer to the vulnerable road user to the slowdown zone located away from the vulnerable road user.

* * * * *